United States Patent
Takada et al.

(10) Patent No.: US 10,266,908 B2
(45) Date of Patent: *Apr. 23, 2019

(54) ROLLED STEEL BAR FOR MACHINE STRUCTURAL USE AND METHOD OF PRODUCING THE SAME

(71) Applicant: NIPPON STEEL & SUMITOMO METAL CORPORATION, Tokyo (JP)

(72) Inventors: Hiromasa Takada, Chiba (JP); Shinya Teramoto, Hokkaido (JP); Osamu Ohyama, Hokkaido (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 146 days.

This patent is subject to a terminal disclaimer.

(21) Appl. No.: 15/322,251

(22) PCT Filed: Jul. 3, 2015

(86) PCT No.: PCT/JP2015/069272
§ 371 (c)(1),
(2) Date: Dec. 27, 2016

(87) PCT Pub. No.: WO2016/002931
PCT Pub. Date: Jan. 7, 2016

(65) Prior Publication Data
US 2017/0152578 A1   Jun. 1, 2017

(30) Foreign Application Priority Data

Jul. 3, 2014   (JP) ................ 2014-137878

(51) Int. Cl.
| | |
|---|---|
| B22D 11/00 | (2006.01) |
| B23K 7/00 | (2006.01) |
| B23K 7/06 | (2006.01) |
| C21D 8/00 | (2006.01) |
| C21D 8/06 | (2006.01) |
| C22C 38/00 | (2006.01) |
| C22C 38/02 | (2006.01) |
| C22C 38/04 | (2006.01) |
| C22C 38/06 | (2006.01) |
| C22C 38/24 | (2006.01) |
| C22C 38/28 | (2006.01) |
| C22C 38/60 | (2006.01) |
| C21D 9/00 | (2006.01) |

(52) U.S. Cl.
CPC .......... *C21D 9/0081* (2013.01); *B22D 11/001* (2013.01); *B23K 7/008* (2013.01); *B23K 7/06* (2013.01); *C21D 8/005* (2013.01); *C21D 8/06* (2013.01); *C21D 8/065* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/24* (2013.01); *C22C 38/28* (2013.01); *C22C 38/60* (2013.01); *C21D 2211/005* (2013.01); *C21D 2211/009* (2013.01)

(58) Field of Classification Search
CPC ........ B22D 11/001; B23K 7/008; B23K 7/06; C21D 8/005; C21D 8/06; C21D 8/065; C21D 9/0081; C22C 38/00; C22C 38/001; C22C 38/002; C22C 38/02; C22C 38/04; C22C 38/06; C22C 38/24; C22C 38/28; C22C 38/60
See application file for complete search history.

(56) References Cited

U.S. PATENT DOCUMENTS

| | | | | |
|---|---|---|---|---|
| 3,846,186 A | * | 11/1974 | Tipnis et al. | C22C 38/60 148/325 |
| 9,574,255 B2 | * | 2/2017 | Higashida | C21D 8/06 |
| 9,951,403 B2 | * | 4/2018 | Matsui | C21D 8/06 |
| 9,994,943 B2 | * | 6/2018 | Matsui | C21D 8/06 |

(Continued)

FOREIGN PATENT DOCUMENTS

| | | |
|---|---|---|
| CN | 1169492 C | 10/2004 |
| EP | 1312689 A1 | 5/2003 |

(Continued)

OTHER PUBLICATIONS

International Search Report, issued in PCT/JP2015/069272, dated Oct. 6, 2015.
Written Opinion of the International Searching Authority, issued in PCT/JP2015/069272, dated Oct. 6, 2015.
Notice of Allowance dated Aug. 29, 2017, in Japanese Patent Application No. 2016-531473, with English translation.
Office Action dated Nov. 29, 2017, in Chinese Patent Application No. 201580034599.3, with partial English translation.
Chinese Office Action and Search Report for Chinese Application No. 201580035172.5, dated Nov. 1, 2017, with partial English translation.
International Search Report (Form PCT/ISA/210) for International Application No. PCT/JP2015/069289, dated Sep. 29, 2015, with English translation.

(Continued)

*Primary Examiner* — Cam N. Nguyen
(74) *Attorney, Agent, or Firm* — Birch, Stewart, Kolasch & Birch, LLP

(57) ABSTRACT

A rolled steel bar for machine structural use includes a predetermined chemical composition comprising, by mass %, C: 0.45% to 0.65%, Si: higher than 1.00% to 1.50%, Mn: higher than 0.40% to 1.00%, P: 0.005% to 0.050%, S: 0.020% to 0.100%, V: 0.08% to 0.20%, Ti: 0% to 0.050%; Ca: 0% to 0.0030%, Zr: 0% to 0.0030%, Te: 0% to 0.0030%, and a remainder including Fe and impurities, wherein the impurities include: Cr: 0.10% or lower, Al: lower than 0.01%, and N: 0.0060% or lower. In the rolled steel bar for machine structural use, K1 obtained from "K1=C+Si/7+Mn/5+1.54×V" is 0.95 to 1.05, K2 obtained from "K2=139−28.6×Si+105×Mn−833×S−13420×N" is more than 35, a Mn content and a S content satisfy Mn/S≥8.0, and a total decarburized depth of a surface layer is 500 μm or less.

4 Claims, No Drawings

(56) References Cited

U.S. PATENT DOCUMENTS

| | | | | |
|---|---|---|---|---|
| 2006/0196583 | A1* | 9/2006 | Hayashi | C22C 38/02 |
| | | | | 148/330 |
| 2007/0000582 | A1* | 1/2007 | Matsuzaki | C22C 38/02 |
| | | | | 148/575 |
| 2007/0163687 | A1* | 7/2007 | Kurosawa | C21D 9/30 |
| | | | | 148/566 |
| 2008/0247900 | A1* | 10/2008 | Hayashi | C21D 1/10 |
| | | | | 420/84 |
| 2015/0034049 | A1* | 2/2015 | Matsui | C21D 8/06 |
| | | | | 123/456 |
| 2015/0125339 | A1* | 5/2015 | Imataka | C21D 8/06 |
| | | | | 420/91 |
| 2015/0218685 | A1 | 8/2015 | Teramoto et al. | |
| 2017/0067140 | A1* | 3/2017 | Aiso | C22C 38/60 |
| 2018/0057917 | A1* | 3/2018 | Matsui | C21D 8/06 |

FOREIGN PATENT DOCUMENTS

| | | | |
|---|---|---|---|
| JP | 59-177352 A | 10/1984 | |
| JP | 5-306432 A | 11/1993 | |
| JP | 7-3386 A | 1/1995 | |
| JP | 9-143610 A | 6/1997 | |
| JP | 10-226847 A | 8/1998 | |
| JP | 11-152542 A | 6/1999 | |
| JP | 2000-256741 A | 9/2000 | |
| JP | 2004-60046 A | 2/2004 | |
| JP | 2004-60049 A | 2/2004 | |
| JP | 2004-346415 A | 12/2004 | |
| JP | 101410541 A | 4/2009 | |
| JP | 2009-228051 A | 10/2009 | |
| JP | 102985577 A | 3/2013 | |
| JP | 2013-107127 A | 6/2013 | |
| JP | 5522321 B1 | 6/2014 | |
| KR | 10-2009-0071163 A | 7/2009 | |

OTHER PUBLICATIONS

U.S. Office Action for U.S. Appl. No. 15/322,360, dated Aug. 6, 2018.

Written Opinion of the International Searching Authority (Form PCT/ISA/237) for International Application No. PCT/JP2015/069289, dated Sep. 29, 2015.

* cited by examiner

ROLLED STEEL BAR FOR MACHINE STRUCTURAL USE AND METHOD OF PRODUCING THE SAME

TECHNICAL FIELD OF THE INVENTION

The present invention relates to a rolled steel bar for machine structural use which is suitable as a material of a mechanical component or a structural member (hereinafter, referred to as "mechanical structural member") produced by hot forging or the like, and a method of producing the same.

Priority is claimed on Japanese Patent Application No. 2014-137878, filed on Jul. 3, 2014, the content of which is incorporated herein by reference.

RELATED ART

In a mechanical structural member used in a vehicle, an industrial machine, or the like, not only high strength but also excellent ductility and toughness may be required. In this case, it is preferable that a metallographic structure of the mechanical structural member is tempered martensite. Therefore, in many cases, the mechanical structural member is formed by performing a refining heat treatment such as quenching and tempering, and machining a hot forged steel bar which is a material of the mechanical structural member.

On the other hand, in a mechanical structural member in which high toughness or ductility are not necessary, in general, machining is performed after hot forging without performing a refining heat treatment from the viewpoint of production costs. In a case where a metallographic structure of steel (non-heat treated steel), which is produced without performing a refining heat treatment, is a composite structure including ferrite and pearlite, excellent machinability and a high yield ratio are obtained. In a case where the metallographic structure includes bainite, the machinability deteriorates, and the yield ratio decreases. Therefore, in many cases, a metallographic structure of rolled or normalized steel is a composite structure including ferrite and pearlite.

In addition, fatigue resistance may be required for a mechanical structural member.

In this case, a mechanical structural member having a metallographic structure, which is a composite structure including ferrite and pearlite, has a problem in that soft ferrite causes fatigue fracture. In order to solve the problem, for example, Patent Documents 1 to 3 disclose steel or a hot-forged product in which fatigue resistance is improved by hardening ferrite and reducing the difference in hardness between ferrite and pearlite due to solid solution strengthening by addition of Si and precipitation strengthening by addition of V or the like.

However, in Patent Document 1, it is necessary that steel contain more than 0.30% of V. In a case where the steel contains a large amount of V, even if the heating temperature during hot forging is sufficiently high, V is not sufficiently solid-soluted. In this case, undissolved V carbide remains, which causes a problem in that the strength and ductility of the mechanical structural member deteriorate.

In addition, in Patent Document 2, it is necessary that steel contains 0.01% or higher of Al. However, Al has a problem in that Al forms a hard oxide in the steel that significantly deteriorates the machinability thereof.

In addition, in Patent Document 3, it is necessary that steel contains 1.0% or higher of Mn and 0.20% or higher of Cr. However, Mn and Cr have a problem in that they promote bainite transformation and thereby deteriorating machinability and decreasing the yield ratio.

On the other hand, for example, Patent Document 4 discloses a steel in which fatigue resistance (fatigue strength) is improved by solid solution strengthening using Si instead of V, which is an expensive element and due to refinement of lamellar spacing by addition of Cr.

However, in a case where steel contains a certain amount or less of Si, fatigue resistance can be improved. However, in a case where steel contains a large amount of Si, there is a problem in that a decarburized layer is formed on a surface of steel and the fatigue resistance of the steel as a mechanical structural member deteriorates. In addition, in Patent Document 4, it is necessary that steel contains 0.10% or higher of Cr. However, Cr promotes bainite transformation and thereby deteriorating machinability and decreasing the yield ratio.

PRIOR ART DOCUMENT

Patent Document

[Patent Document 1] Japanese Unexamined Patent Application, First Publication No. H7-3386
[Patent Document 2] Japanese Unexamined Patent Application, First Publication No. H9-143610
[Patent Document 3] Japanese Unexamined Patent Application, First Publication No. H11-152542
[Patent Document 4] Japanese Unexamined Patent Application, First Publication No. H10-226847

DISCLOSURE OF THE INVENTION

Problems to be Solved by the Invention

As described above, in the related art, a mechanical structural member having excellent fatigue resistance, which contains a large amount of Si without containing Cr and Al to reduce the costs, has not been provided.

The present inventors performed a thorough investigation and found that, in order to improve the fatigue resistance of a mechanical structural member, in particular, it is important to control the hardness of a surface of the mechanical structural member. In addition, the present inventors found that, in order to control the hardness of a surface of a mechanical structural member, it is effective to control a structure of a surface part of a rolled steel bar (rolled steel bar for machine structural use) which is a material of the mechanical structural member.

The present invention has been made in consideration of the above-described circumstances, and an object thereof is to provide a rolled steel bar for machine structural use which is suitable as a material of a mechanical structural member in which high strength and excellent fatigue resistance are required, and a method of producing the same.

Means for Solving the Problem

As described above, in order to improve the fatigue resistance of a mechanical structural member, it is important to control the hardness of, in particular, a surface of the mechanical structural member. To that end, it is effective to control a structure of a surface part of a rolled steel bar (rolled steel bar for machine structural use) which is a material of the mechanical structural member.

However, it was found that, in a case where a rolled steel bar, which contains a large amount of Si without containing Cr to reduce cost, is used as a material of a mechanical structural member, decarburization of a surface of the mechanical structural member is significant, the hardness decreases, and the fatigue resistance deteriorates.

Therefore, the present inventors investigated the effect of decarburization on fatigue resistance and the reason for decarburization in a mechanical structural member which is formed of a rolled steel bar containing a large amount of Si. As a result, the present inventors discovered that the decarburization of a surface of the mechanical structural member occurs due to the rolled steel bars which are the material of the mechanical structural member. In addition, the present inventor made it clear that decarburization of a surface of a rolled steel bar can be reduced by removing a decarburized layer of cast piece which is used for manufacturing a rolled steel bar and succeeded to improve the fatigue resistance of the mechanical structural member.

Further, the present inventors discovered an optimum chemical composition and production conditions of a rolled steel bar with which the strength of a mechanical structural member, which is formed by hot-forging the rolled steel bar, can be improved while securing the hot ductility of the rolled steel bar which requires during hot forging.

In addition, the present inventors also discovered that excellent fatigue resistance can be obtained in the mechanical structural member which is obtained by hot-forging the rolled steel bar.

The present invention has been made based on the above-described findings. The summary of the present invention is as follows.

(1) According to a first aspect of the present invention, a rolled steel bar for machine structural use having a chemical composition including, by mass %, C: 0.45% to 0.65%, Si: higher than 1.00% to 1.50%, Mn: higher than 0.40% to 1.00%, P: 0.005% to 0.050%, S: 0.020% to 0.100%, V: 0.08% to 0.20%, Ti: 0% to 0.050%, Ca: 0% to 0.0030%, Zr: 0% to 0.0030%, Te: 0% to 0.0030%, and a remainder including Fe and impurities, in which the impurities include Cr: 0.10% or lower, Al: lower than 0.01%, and N: 0.0060% or lower, K1 obtained from the following Expression 1 is 0.95 to 1.05, K2 obtained from the following Expression 2 is more than 35, the Mn content and the S content satisfy the following Expression 3, and a total decarburized depth of a surface layer is 500 μm or less, $$K1=C+Si/7+Mn/5+1.54\times V \quad \text{(Expression 1)},$$

$$K2=139-28.6\times Si+105\times Mn-833\times S-13420\times N \quad \text{(Expression 2), and}$$

$$Mn/S\geq 8.0 \quad \text{(Expression 3)}$$

C, Si, Mn, V, S, and N in Expressions 1 to 3 represent the contents of the respective elements in mass %.

The rolled steel bar for machine structural use according to (1), wherein the chemical composition may further include, by mass %, one or more selected from the group consisting of Ti: 0.010% to 0.050%, Ca: 0.0005% to 0.0030%. Zr: 0.0005% to 0.0030%, and Te: 0.0005% to 0.0030%.

According to another aspect of the present invention, a method of producing a rolled steel bar for machine structural use, the rolled steel bar for machine structural use being the rolled steel bar according to (1) to (2) includes: making molten steel having the chemical composition according to (1) or (2); continuously casting the molten steel to obtain a cast piece; blooming the cast piece to obtain a steel piece; scarfing all faces of the steel piece after the blooming at 2 mm or more from a surface; and performing a steel bar rolling after holding the steel piece after the scarfing at a heating temperature of 1000° C. to 1150° C. for 7000 seconds or shorter.

Effects of the Invention

In the rolled steel bar for machine structural use according to the aspects of the present invention in which the Cr content and the Al content are limited and which includes a large amount of Si to reduce the costs, the thickness of a decarburized layer of a surface layer can be prevented. A mechanical structural member which is produced by hot-forging the rolled steel bar has excellent fatigue resistance and thus remarkably contributes to the industry.

EMBODIMENT OF THE INVENTION

A rolled steel bar for machine structural use according to an embodiment of the present invention (hereinafter, also referred to as "rolled steel bar according to the embodiment") has a chemical composition including, by mass %, C: 0.45% to 0.65%, Si: higher than 1.00% to 1.50%, Mn: higher than 0.40% to 1.00%, P: 0.005% to 0.050%, S: 0.020% to 0.100%, V: 0.08% to 0.20%, and a remainder including Fe and impurities, and optionally further includes Ti: 0.050% or lower, Ca: 0.0030% or lower, Zr: 0.0030% or lower, and Te: 0.0030% or lower. In the rolled steel bar for machine structural use, the impurities includes Cr: 0.10% or lower, Al: lower than 0.01%, and N: 0.0060% or lower, K1 obtained from "K1=C+Si/7+Mn/5+1.54×V" is 0.95 to 1.05, K2 obtained from "K2=139−28.6×Si+105×Mn−833×S−13420×N" is more than 35, the Mn content and the S content satisfy Mn/S≥8.0, and the total decarburized depth in surface layer is 500 μm or less.

First, the chemical composition of the rolled steel bar according to the embodiment will be described. Hereinafter, "%" regarding the chemical composition represents "mass %". In a case where the amount is expressed by a range in the following description, the range includes an upper limit and a lower limit. That is, in a case where the amount is expressed by a range of 0.45% to 0.65%, for example, the range represents 0.45% or higher and 0.65% or lower.

(C: 0.45% to 0.65%)

C is a useful element which can increase the tensile strength of the steel at low cost. In order to obtain the effect, the C content is set to be 0.45% or higher. On the other hand, the higher the C content in the steel, the lower the yield ratio of the mechanical structural member obtained by forging a hot rolled steel bar. The yield ratio is a value obtained by dividing a 0.2% proof stress by a tensile strength. When the yield ratio decreases, in a case where the 0.2% proof stress is a predetermined value, the tensile strength increases excessively, which causes deterioration in machinability. Accordingly, the C content is set to be 0.65% or less in order to prevent a decrease in the yield ratio of the mechanical structural member. The C content is preferably 0.60% or lower.

(Si: Higher than 1.00% to 1.50%)

Si is an element that is inexpensive and is effective for contributing to high-strengthening of the steel. In order to obtain the effect, the Si content is set to be higher than 1.00%. The Si content is preferably 1.10% or higher. On the other hand, in a case where the Si content is excessively high, the decarburized layer depth of surface layer is excessively large, hot ductility deteriorates, and defects are likely to occur during steel bar rolling or hot forging. Therefore, the Si content is set to be 1.50% or lower.

(Mn: Higher than 0.40% to 1.00%)

Mn is a solid solution strengthening element that can increase the strength of the steel while preventing a decrease in ductility as compared to Si and V. In addition, Mn is an element that is bonded to S to form MnS and to thereby improve machinability. When the Mn content is low, S forms FeS at an austenite grain boundary and deteriorates hot ductility. Therefore, cracks or defects are likely to be initiated. Accordingly, in order to prevent the formation of FeS and to secure hot ductility, the Mn content is higher than 0.40%. On the other hand, in a case where the Mn content is excessively high, bainite that decreases the yield ratio may also be present in a structure of a hot-forged product. Therefore, the Mn content is set to be 1.00% or lower. The Mn content is preferably 0.95% or lower and is more preferably 0.90% or lower.

(P: 0.005% to 0.050%)

P is an element that promotes ferrite transformation to prevent bainite transformation. In order to prevent bainite transformation during cooling after hot forging, the P content is set to be 0.005% or higher. On the other hand, in a case where the P content is excessively high, hot ductility deteriorates, and defects may be initiated in the billet. Therefore, the upper limit of the P content is limited to 0.050%. The P content is preferably 0.040% or lower.

(S: 0.020% to 0.100%)

S is an element that forms manganese sulfide (MnS) to improve machinability, and contributes to improvement of machinability. In order to obtain the effect, the S content is set to be 0.020% or higher. On the other hand, in a case where the S content is higher than 0.100%, a large amount of coarse MnS is dispersed in the steel, hot ductility deteriorates, and defects may be initiated in the billet. Therefore, the upper limit of the S content is limited to 0.100%.

(V: 0.08% to 0.20%)

V is an element that forms V carbide and/or V nitride to contribute to precipitation strengthening of the steel, and has an effect of increasing the yield ratio of the steel. In order to obtain the effect, the V content is set to be 0.08% or higher. On the other hand, V is an expensive alloy element and promotes undesirable bainite transformation during cooling after hot forging. Accordingly, in order to reduce the costs and to prevent bainite transformation, the V content is set to be 0.20% or lower. The V content is preferably 0.15% or lower.

The rolled steel bar according to the embodiment has the above-described chemical composition and contains a remainder including Fe and impurities. However, the rolled steel bar according to the embodiment optionally further includes Ca, Te, Zr, and Ti in the following ranges instead of a portion of Fe. However, since it is not necessary that the rolled steel bar includes these elements, the lower limits thereof are 0%.

Here, the impurities refer to elements that are incorporated from raw materials such as ore or scrap, or incorporated in various environments of the production process when the steel is industrially produced, and the impurities are allowed to be included in the steel in a range where there are no adverse effects in the present invention. The amounts of, in particular, Al, N, and Cr among the impurities, are limited to the following ranges.

(Al: Lower than 0.01%)

Al is an impurity. In a case where Al is present in the steel, Al is bonded to oxygen to form hard Al oxide and to thereby deteriorate the machinability of the steel. Accordingly, the lower the Al content, the better. In a case where the Al content is 0.01% or higher, the machinability deteriorates significantly. Therefore, the Al content is limited to lower than 0.01%.

(N: 0.0060% or Lower)

N is an impurity. In a case where N is present in the steel, N is bonded to V to form V nitride. The V nitride is coarser than V carbide and has a small contribution to precipitation strengthening as compared to V carbide. Accordingly, as the N content increases, the amount of V nitride increases, and the amount of V carbide decreases accordingly. As a result, the contribution of V to precipitation strengthening decreases. In order to obtain the effect of sufficient precipitation strengthening even in a case where the V content is low, it is preferable that the total amount of V nitride is small. Therefore, it is preferable that the N content is low. In a case where the N content is higher than 0.0060%, the contribution of V to precipitation strengthening decreases significantly. Therefore, the N content is limited to 0.0060% or lower. On the other hand, in a case where the amount of N is reduced excessively, the costs significantly increase due to steelmaking technical reasons. Therefore, the lower limit of the N content may be set as 0.0020%.

(Cr: 0.10% or Lower)

Cr is an impurity. Cr has little effect on the strength but promotes bainite transformation during cooling after hot forging. Therefore, in a case where the Cr content increases, the yield ratio of a mechanical structural member obtained by hot-forging the rolled steel bar decreases. The lower the Cr content is, the better it is. In a case where the Cr content is higher than 0.10%, the effect thereof is significant. Therefore, the Cr content is limited to 0.10% or lower.

(Ca: 0.0005% to 0.0030%)
(Zr: 0.0005% to 0.0030%)
(Te: 0.0005% to 0.0030%)

Ca, Te, and Zr are elements that refine and spheroidize MnS particles (that is, control the form of a sulfide). In a case where MnS is stretched, the anisotropy of hot ductility increases. Therefore, cracks are likely to occur in a specific direction. In a case where it is necessary to control the initiation of cracks, the steel may contain one or more selected from Ca, Zr, and Te. In order to obtain the effect of refining and spheroidizing MnS, it is preferable that each of the Ca content, the Zr content, and/or the Te content is 0.0005% or higher. On the other hand, in a case where the Ca content, the Zr content, or the Te content is excessively high, a coarse oxide of Ca, Zr, or Te is formed, and thus the machinability deteriorates. Therefore, even in a case where the steel contains Ca, Zr, or Te, it is preferable that each of the Ca content, the Zr content, and the Te content is 0.0030% or lower.

(Ti: 0.010% to 0.050%)

Ti is an element that forms Ti nitride in the steel. Ti nitride has an effect of refining grains of the structure of the steel. In order to obtain this effect, it is preferable that the Ti content be 0.010% or higher. On the other hand, Ti nitride is hard, which may decrease the tool life during cutting. Therefore, in a case where the steel contains Ti, the Ti content is set to be 0.050% or lower.

In the rolled steel bar according to the embodiment, it is necessary that not only the amounts of the above-described respective elements but also the amounts of C, Si, Mn, V, S, and N satisfy the following relationships. In the following expressions, C, Si, Mn, V, S, and N represent the amounts of the respective elements in mass %.

(K1: 0.95 to 1.05)

K1 is a carbon equivalent that is an index indicating the strength and is obtained from the following (Expression 1).

$$K1 = C + Si/7 + Mn/5 + 1.54 \times V \quad \text{(Expression 1)}$$

The tensile strength of a mechanical structural member that is formed by hot-forging the rolled steel bar according to the embodiment is affected by the carbon equivalent K1. In a case where a mechanical structural member is produced by hot-forging a rolled steel bar having a K1 value of 0.95 or more, a structure of the mechanical structural member includes pearlite, which is a major component, and ferrite, and the mechanical structural member has a tensile strength of higher than 900 MPa, a 0.2% proof stress of 570 MPa or higher, and a fatigue limit ratio (fatigue limit/tensile strength) of 0.45 or higher. On the other hand, in a case where K1 is higher than 1.05, bainite is formed in the mechanical structural member, which decreases the yield ratio. Accordingly, the carbon equivalent K1 is limited to 0.95 to 1.05.

(K2>3 5)

K2 is an index indicating hot ductility that is obtained from an experiment described below by the present inventors, and is obtained from the following (Expression 2).

$$K2=139-28.6 \times Si+105 \times Mn-833 \times S-13420 \times N \quad \text{(Expression 2)}$$

In the experiment, 17 rolled steel bars, which contained 0.52% to 0.54% of C and were different from each other in the amounts of Si, Mn, P, S, and N, were used. The hot ductility of a test piece having a diameter of 10 mm and a length of 100 mm, which was obtained by cutting and processing each of the rolled steel bars, was evaluated. The hot ductility was evaluated based on values of reduction in area after breaking which was obtained using a method including: heating and melting the center of the test piece; holding the test piece at various temperatures immediately after the test piece was solidified; and drawing the test piece at a rate of 0.05 mm/s to break the test piece. Regression computation was performed by using the values of reduction in area at the holding temperatures (tensile temperatures) of 950° C., 1100° C., and 1200° C. as dependent variables and using the amounts of the alloy elements as independent variables, and significant independent variables were averaged to obtain K2 (Expression 2).

As a result, in a case where this K2 value is more than 35, defects or cracks do not occur during the casting of the billet and the hot forging of the rolled steel bar. Accordingly, the hot ductility index K2 is set to be more than 35.

The upper limit of K2 is not necessarily limited and is determined based on the ranges of the respective amounts of Si, Mn, S, and N. For example, the upper limit of K2 may be set as 100.

As can be seen from Expression 2, Si, S, and N are factors that deteriorate hot ductility, and Mn is a factor that improves hot ductility. Therefore, basically, it is necessary that the K2 value is satisfied in consideration a balance between the above factors. However, as described below, in a case where Mn/S is lower than 8.0, harmful FeS is formed. Even if the K2 value is more than 35, in a case where Mn/S is lower than 8.0, the characteristics deteriorate.

(Mn/S≥8.0)

As described above, S is bonded to Mn to form MnS. However, in a case where the S content is excessively high with respect to the Mn content, not only MnS but also FeS are formed at an austenite grain boundary. As a result, in this case, hot ductility deteriorates significantly, and cracks occur during hot forging. Accordingly, in order to prevent the formation of FeS, Mn/S is set to be 8.0 or higher. In a case where Mn/S is 8.0 or higher, the above-described K2 value is controlled by hot ductility. Accordingly, Mn/S is not particularly limited as long as it is 8.0 or higher, and the upper limit thereof is determined based on the minimum value of the S content and the maximum value of the Mn content.

Next, the decarburized depth and the structure of the rolled steel bar according to the embodiment will be described.

[Total Decarburized Depth in Surface Layer]

As described above, the decarburized depth of the rolled steel bar (total decarburized depth in surface layer) affects the fatigue resistance of a mechanical structural member obtained by hot-forging the rolled steel bar. In a mechanical structural member that is formed by hot-forging a rolled steel bar having a total decarburized depth in surface layer of more than 500 μm, the fatigue resistance (fatigue limit ratio) deteriorates. As the total decarburized depth in surface layer increases, tensile strength, proof stress, and fatigue limit ratio may decrease due to decarburization depending on steel components. Accordingly, the total decarburized depth in surface layer of the rolled steel bar is set to be 500 μm or lower. The lower limit is 0 μm (that is, a decarburized layer may not be present).

In the embodiment, the total decarburized depth in surface layer of the rolled steel bar is defined as the average value of decarburized depths in surface layer measured at 12 positions in total when decarburized depths are measured at four positions at an angle interval of 90 degrees in a circumferential direction of each of three cross-sections, the three cross-sections being obtained by cutting the rolled steel bar at the center thereof in a longitudinal direction and at two positions at a length of ¼ of the total length from two opposite ends thereof. The decarburized depth of surface layer is defined as the depth at which the carbon content measured at a straight line moving to the inside from the surface is 90% or higher of the constant carbon content measured at the inside (internal carbon content), and can be measured using an electron probe micro analyzer (EPMA).

It is not necessary to limit the structure (metallographic structure) of the rolled steel bar according to the embodiment. However, as described above, it is preferable that the mechanical structural member has a composite structure (ferrite-pearlite structure) including ferrite and pearlite. In a case where the structure of the mechanical structural member is a structure including ferrite and pearlite, the structure of the rolled steel bar is also a structure including ferrite and pearlite in many cases.

Next, an example of a method of producing the rolled steel bar according to the embodiment will be described.

The rolled steel bar according to the embodiment is produced using a method including: making molten steel having the above-described chemical composition using an ordinary method (molten steel making step); producing a cast piece by an ordinary method, for example, continuous casting (casting step); blooming the cast piece to obtain a steel piece (blooming step), scarfing all faces of the steel piece (scarfing step), and hot-rolling (also referred to as steel bar rolling) the steel piece after scarfing (steel bar rolling step).

In a case where the steel piece in which all faces are scarfed at 2 mm or more during the scarfing step is subjected to the steel bar rolling step, not only decarburization of the steel bar, but also decarburization of the mechanical structural member which is produced by forging the rolled steel bar are suppressed. As a result, deterioration of the fatigue resistance of the mechanical structural member can be prevented.

A deep decarburized layer which is formed on the surface of the steel piece having Si as mentioned above remains not only in the rolled steel bar but also in the hot forgings (the mechanical structural member) produced using the steel bar as a material. In addition, the deep decarburized layer deteriorates the mechanical properties of the mechanical structural member, in particular, the fatigue resistance. For example, the present inventors performed an investigation and found that: in a case where the steel piece having large amount of Si was cast to have a cross-sectional area of 196000 cm$^2$ and was bloomed to have the cross-sectional area of 26244 cm$^2$, the decarburized depth of surface layer was 1.8 mm at a maximum. Accordingly, although the depth of the decarburization depends on the size of the cast piece and the size of the steel piece, in a case the steel piece is produced through the blooming step, as long as the steel piece is hot rolled after blooming and scarfing the face at 2 mm or more from the surface, it is possible to set the total decarburized depth in surface layer to 500 μm or less. On the other hand, when the scarfing amount is excessive, a reduction of the weight, an increase of the surface deterioration, an increase of the scarfing cost, and an increase of the scarfing time are worried. Therefore, it is preferable to set the scarfing amount to be 10 mm or less. It is preferable that the scarfing is performed on all faces of the steel piece.

The object of the scarfing the steel piece is to remove the deep decarburized layer formed during the continuous casting. In subsequent steps, when the conditions are controlled properly, the deep decarburized layer which deteriorates the fatigue resistance of the hot forging is not formed. According to the size of the steel piece, blooming is performed again after blooming and scarfing; however, the heating time in blooming is set to 900 seconds or shorter.

Scarfing of the steel piece may be performed by thermomechanilally scarfing the surface of the steel piece using combustion gas and oxygen. In addition, the scarfing may be performed in a state that the steel piece has a high temperature or in a state that the steel piece is cooled. In a case where the blooming is performed again after the blooming and the scarfing, it is preferable that the scarfing is performed in a state in which the steel piece is not cooled and has a high temperature. On the other hand, machining using a grinder and the like, is inefficient, therefore, is not included in the method of the present embodiment.

In the steel bar rolling (hot rolling) step, in order to promote solid solution of V into the steel, it is necessary to heat the billet to 1000° C. or higher and to perform hot rolling. By dissolving V to be solid-soluted during the heating of the steel bar rolling, the size of V carbide that reprecipitates in the rolled steel bar after hot rolling is small. As a result, during heating for hot-forging the rolled steel bar, the solid solution of V carbide is easy, and the amount of undissolved V carbide that causes a decrease in the strength and ductility of the mechanical structural member is reduced. In a case where the heating temperature is lower than 1000° C., V is not sufficiently solid-soluted. On the other hand, it is necessary that the upper limit of the heating temperature during the steel bar rolling is set as 1150° C. The reason for this is that, in a case where the billet is heated to a temperature of higher than 1150° C., the rate of surface decarburization increases rapidly. In addition, in a case where the holding time at the heating temperature increases, the decarburization is promoted. Accordingly, in order to reduce the total decarburized depth in surface layer of the rolled steel bar to 500 μm or less, the holding time at the heating temperature (1000° C. to 1150° C.) is set to be 7000 seconds or shorter. In order to sufficiently solid-solute V, it is preferable that the lower limit of holding time is set to be 10 seconds.

According to the production method including the above-described steps, the rolled steel bar according to the embodiment can be obtained. In addition, by forging the rolled steel bar, a structural member having excellent fatigue resistance can be obtained. Forging conditions may be the same as conditions under which a rolled steel bar is usually forged. For example, the heating temperature is 1000° C. to 1300° C. In a case where a mechanical structural member is formed by forging, a material of the mechanical structural member is hot-forged after high-frequency heating in many cases. Since the high-frequency heating, the heating time for the temperature to reach a predetermined value is short, extreme decarburization is less likely to occur on the surface layer of the material (rolled steel bar).

EXAMPLES

Example 1

By casting Steel A having a chemical composition shown in Table 1, cast piece having a size of 350×560 mm was obtained. Steel A includes a low amount of C and a high amount of Si, in which decarburization is likely to occur. The remainder of Table 1 includes Fe and impurities. All of the faces of the cast piece are scarfed under the conditions in which target scarfing amount is 1 mm, 2 mm, or 3 mm immediately after heating the cast piece to 1300° C. and blooming the cast piece to have a cross section size of 280×280 mm, is rolled to have the cross section size of 162×162 mm, and is cooled to obtain a steel piece as a material of a rolled steel bar.

The steel pieces were heated to 1150° C. or 1230° C., were held at this temperature for 5000 seconds or 10000 seconds, and then were hot-rolled to produce rolled steel bars having a diameter of 50 mm. Then, these rolled steel bars were air-cooled at room temperature. The total decarburized depths in surface layer of the rolled steel bars were obtained using the above-described method.

Table 2 shows the results of scarfed depth, heating condition during the steel bar rolling, and the measured total decarburized depths in surface layer of the rolled steel bars.

TABLE 1

| Component (mass %) | | | | | | | | | | | |
|---|---|---|---|---|---|---|---|---|---|---|---|
| C | Si | Mn | P | S | V | Cr | Al | N | Mn/S | K1 | K2 |
| 0.45 | 1.50 | 0.84 | 0.020 | 0.044 | 0.09 | 0.08 | 0.005 | 0.0047 | 19.1 | 0.97 | 85 |

TABLE 2

| No. | Average Scarfing Depth mm | Steel Bar Rolling Heating Temperature ° C. | Holding Time s | Total Decarburized Depth of Surface Layer μm | Note |
|---|---|---|---|---|---|
| A1 | <u>1.2</u> | 1150 | 7000 | <u>1228</u> | Comparative Example |
| A2 | 2.0 | 1150 | 7000 | 450 | Example |
| A3 | 3.1 | 1150 | 7000 | 303 | Example |
| A4 | 2.0 | 1150 | <u>10000</u> | 806 | Comparative Example |
| A5 | 2.0 | <u>1230</u> | 5000 | <u>981</u> | Comparative Example |

It can be seen from Samples A1 to A3 that, by adjusting the scarfed depth to be 2.0 mm or more, the decarburized depth of the rolled steel bar can be reduced to be 500 μm or less even in a case where heating conditions during steel bar rolling are a high temperature and a long time such as 1150° C.×7000 seconds, in which decarburization is promoted.

The object of the scarfing the steel piece is to remove the deep decarburized layer formed during the continuous casting. In subsequent steps, the deep decarburized layer which deteriorates the fatigue resistance of the hot forging is not formed.

Sample No. A4 in table 2 is an example in which holding time is excessively long at 1150° C. and the total decarburized depth in surface layer is large. In addition, sample No. A5 is an example in which heating temperature is 1230° C. and the total decarburized depth of the surface layer is large.

Example 2

Steels (Nos. B to AD) having chemical compositions shown in Table 3 were made and then were continuously cast and obtain cast pieces. The cast pieces were bloomed to obtain steel pieces. The steel pieces excluding Test Nos. 12 to 19 were scarfed under conditions in which target scarfing amount is 3 mm. The remainder of Table 3 includes Fe and impurities. These scarfed steel pieces were hot-rolled to produce rolled steel bars having a diameter of 45 mm. Some steel pieces (Test Nos. 12 to 19 in table 4) were scarfed under condition in which the target scarfing amount is 1 mm and were hot-rolled to produce rolled steel bars having a diameter of 45 mm, for purposes of comparison. The steel pieces were hot-rolled at a heating temperature of 1100° C. for a holding time of 3600 seconds. After the hot rolling, the rolled steel bars were air-cooled to normal temperature.

TABLE 3

| Steel No. | C | Si | Mn | P | S | V | Ti | Ca | Zr | Te | Cr | Al | N | Mn/S | K1 | K2 |
|---|---|---|---|---|---|---|---|---|---|---|---|---|---|---|---|---|
| B | 0.46 | 1.50 | 0.54 | 0.020 | 0.035 | 0.15 | | | | | 0.09 | 0.005 | 0.0059 | 15.4 | 1.01 | 44 |
| C | 0.65 | 1.03 | 0.41 | 0.021 | 0.050 | 0.08 | | | | | 0.05 | 0.003 | 0.0024 | 8.2 | 1.00 | 79 |
| D | 0.50 | 1.50 | 0.95 | 0.049 | 0.097 | 0.09 | | | | | 0.06 | 0.006 | 0.0022 | 9.8 | 1.04 | 86 |
| E | 0.54 | 1.01 | 0.60 | 0.026 | 0.044 | 0.11 | | 0.0008 | | | 0.06 | 0.007 | 0.0040 | 13.6 | 0.97 | 83 |
| F | 0.60 | 1.22 | 0.65 | 0.030 | 0.045 | 0.09 | | 0.0011 | | 0.0010 | 0.10 | 0.003 | 0.0039 | 14.4 | 1.04 | 83 |
| G | 0.51 | 1.06 | 0.47 | 0.022 | 0.041 | 0.13 | | | 0.0014 | | 0.08 | 0.008 | 0.0042 | 11.5 | 0.96 | 68 |
| H | 0.49 | 1.20 | 0.44 | 0.031 | 0.055 | 0.19 | 0.032 | 0.0015 | 0.0017 | | 0.05 | 0.008 | 0.0052 | 8.0 | 1.04 | 35 |
| I | 0.52 | 1.12 | 0.52 | 0.025 | 0.042 | 0.14 | 0.021 | 0.0009 | | | 0.06 | 0.003 | 0.0047 | 12.4 | 1.00 | 64 |
| J | 0.49 | 1.06 | 0.55 | 0.025 | 0.060 | 0.14 | | | | | 0.05 | 0.005 | 0.0059 | 9.2 | 0.97 | 36 |
| K | <u>0.40</u> | <u>0.87</u> | 0.90 | 0.030 | 0.045 | 0.08 | | | | | 0.03 | 0.006 | 0.0055 | 20.0 | <u>0.83</u> | 97 |
| L | 0.54 | 1.04 | 0.50 | 0.048 | 0.089 | 0.12 | | | | | 0.04 | 0.007 | 0.0038 | <u>5.6</u> | 0.97 | 37 |
| M | 0.61 | 1.05 | <u>0.25</u> | 0.036 | 0.045 | 0.13 | | | | | 0.04 | 0.005 | 0.0058 | <u>5.6</u> | 1.01 | <u>20</u> |
| N | 0.55 | <u>1.85</u> | 0.42 | 0.035 | 0.044 | 0.08 | | | | | 0.09 | 0.007 | 0.0056 | 9.5 | 1.02 | <u>18</u> |
| O | 0.46 | 1.03 | <u>1.22</u> | 0.025 | 0.045 | 0.08 | | | | | <u>0.15</u> | 0.008 | 0.0051 | 27.1 | 0.97 | 132 |
| P | 0.46 | 1.03 | 0.45 | 0.041 | 0.040 | 0.08 | | | | | 0.07 | 0.006 | 0.0037 | 11.3 | <u>0.82</u> | 74 |
| Q | 0.53 | 1.49 | 0.50 | 0.047 | 0.048 | 0.11 | | 0.0012 | | | 0.07 | 0.005 | 0.0059 | 10.4 | 1.01 | <u>30</u> |
| R | 0.60 | 1.06 | 0.84 | 0.033 | <u>0.143</u> | 0.08 | | | | 0.0009 | 0.08 | 0.004 | 0.0044 | <u>5.9</u> | 1.04 | <u>19</u> |
| S | <u>0.70</u> | 1.01 | 0.41 | 0.025 | 0.036 | 0.08 | | 0.0005 | | | 0.10 | 0.007 | 0.0040 | 11.4 | 1.05 | 69 |
| T | 0.52 | 1.02 | 0.42 | 0.032 | 0.046 | <u>0.04</u> | | | | | 0.05 | 0.005 | 0.0041 | 9.1 | <u>0.81</u> | 61 |
| U | 0.45 | 1.02 | 0.50 | 0.042 | 0.050 | <u>0.22</u> | | | | | 0.05 | 0.006 | 0.0057 | 10.0 | 1.03 | 44 |
| V | 0.55 | 1.50 | 0.79 | 0.014 | 0.031 | 0.08 | | | | | <u>0.15</u> | 0.005 | <u>0.0108</u> | 25.5 | 1.05 | <u>8</u> |
| W | 0.48 | 1.40 | 0.55 | 0.033 | 0.050 | 0.09 | | | | | 0.09 | 0.005 | 0.0048 | 11.0 | <u>0.93</u> | 51 |
| X | <u>0.44</u> | 1.39 | 0.44 | 0.025 | 0.051 | 0.15 | | 0.0015 | 0.0018 | | 0.08 | 0.008 | 0.0050 | 8.6 | 0.96 | 36 |
| Y | 0.53 | <u>0.99</u> | 0.57 | 0.035 | 0.041 | 0.11 | 0.034 | 0.0009 | | | 0.06 | 0.007 | 0.0047 | 13.9 | 0.95 | 73 |
| Z | 0.60 | 1.12 | 0.51 | 0.031 | 0.059 | <u>0.07</u> | 0.028 | | | | 0.07 | 0.004 | 0.0039 | 8.6 | 0.97 | 59 |
| AA | 0.49 | 1.14 | <u>1.03</u> | 0.043 | 0.034 | 0.12 | | 0.0018 | | 0.0008 | 0.08 | 0.002 | 0.0037 | 30.3 | 1.04 | 137 |
| AB | 0.51 | 1.20 | 0.82 | 0.034 | 0.043 | 0.09 | | | | | 0.07 | 0.003 | <u>0.0068</u> | 19.1 | 0.98 | 64 |
| AC | 0.48 | 1.12 | 0.67 | 0.030 | 0.064 | 0.12 | | | | | <u>0.12</u> | 0.005 | 0.0039 | 10.5 | 0.96 | 72 |
| AD | 0.62 | 1.21 | 0.54 | 0.031 | 0.044 | 0.11 | | | | | 0.08 | 0.006 | 0.0041 | 12.3 | <u>1.07</u> | 69 |

Underlined values represents that the values are out of the range of the present invention.

Next, the total decarburized depths in surface layer of the rolled steel bars obtained by hot rolling were measured using the above-described method.

Subsequently, each of the rolled steel bars having a diameter of 45 mm was heated to 1220° C. by high-frequency heating, was held at 1220° C. for 300 seconds, and immediately was pressed in a diameter direction to be forged into a flat sheet having a thickness of 10 mm. By cutting a side surface of the forged flat sheet, a test piece which has a parallel body having a cross-sectional width of 15 mm, a thickness of 10 mm (thickness as forged), and a length of 20 mm was obtained and provided for a tension compression fatigue test under completely reversed tension and compression and a tensile test. The tension compression fatigue test was performed according to JIS Z 2273, in which a maximum load stress representing a lifetime of $10^7$ or more was set as a fatigue limit. The tensile test was performed according to JIS Z 2241 at room temperature at a rate of 20 mm/min.

The forged surface of the parallel body was as forged without working. However, for reference, regarding Steels Nos. B and C, test pieces from which a decarburized layer was removed by grinding the surface into a depth of 500 μm after hot forging were provided (Test Nos. 2 and 3 in Table 4). In addition, all the corners of the cut portions of the test pieces were chamfered with a radius of 2 mm.

Tables 4 and 5 show the total decarburized depth in surface layer of the rolled steel bars before hot forging, the microstructures of the forged flat sheets after hot forging, the 0.2% proof stresses, the tensile strengths, the yield ratios (0.2% proof stress/tensile strength), and the fatigue limit ratios (fatigue limit/tensile strength) at $10^7$ times obtained by the tension compression test.

TABLE 4

| Test No. | Steel No. | Rolled Steel Bar Total Decarburized Depth of Surface Layer μm | Forged Flat Sheet | | | | | Note |
|---|---|---|---|---|---|---|---|---|
| | | | 0.2% Proof Stress MPa | Tensile Strength MPa | Yield Ratio | Fatigue Limit Ratio | Microstructure*1 | |
| 2 | B | 0 (After Scarfing) | 707 | 1010 | 0.70 | 0.51 | FP | Reference |
| 3 | C | 0 (After Scarfing) | 665 | 1024 | 0.65 | 0.49 | FP | Example |
| 4 | B | 320 | 662 | 983 | 0.67 | 0.49 | FP | Example |
| 5 | C | 301 | 624 | 960 | 0.65 | 0.48 | FP | |
| 6 | D | 353 | 672 | 1034 | 0.65 | 0.47 | FP | |
| 7 | E | 429 | 612 | 957 | 0.64 | 0.48 | FP | |
| 8 | F | 111 | 660 | 1032 | 0.64 | 0.49 | FP | |
| 9 | G | 491 | 597 | 948 | 0.63 | 0.48 | FP | |
| 10 | H | 374 | 668 | 1027 | 0.65 | 0.50 | FP | |
| 11 | I | 330 | 642 | 997 | 0.64 | 0.49 | FP | |
| 12 | B | <u>930</u> | 521 | 883 | 0.59 | 0.45 | FP | Comparative |
| 13 | C | <u>709</u> | 527 | 894 | 0.59 | 0.44 | FP | Example |
| 14 | D | <u>1044</u> | 517 | 891 | 0.58 | 0.43 | FP | |
| 15 | E | <u>1120</u> | 501 | 864 | 0.58 | 0.43 | FP | |
| 16 | F | <u>587</u> | 563 | 955 | 0.59 | 0.45 | FP | |
| 17 | G | <u>662</u> | 560 | 902 | 0.62 | 0.44 | FP | |
| 18 | H | <u>878</u> | 531 | 897 | 0.59 | 0.43 | FP | |
| 19 | I | <u>735</u> | 514 | 876 | 0.59 | 0.43 | FP | |
| 20 | J | 375 | 611 | 955 | 0.64 | 0.48 | FP | Example |

*1FP: Ferrite and pearlite structures
Test Nos. 2 and 3 are reference examples in which the decarburized layer was removed by grinding after hot forging.

TABLE 5

| Test No. | Steel No. | Rolled Steel Bar Total Decarburized Depth of Surface Layer μm | Forged Flat Sheet | | | | | Note |
|---|---|---|---|---|---|---|---|---|
| | | | 0.2% Proof Stress MPa | Tensile Strength MPa | Yield Ratio | Fatigue Limit Ratio | Microstructure*2 | |
| 21 | K | 274 | 541 | 784 | 0.69 | 0.50 | FP | Comparative |
| 22 | L | * | * | * | * | * | * | Example |
| 23 | M | * | * | * | * | * | * | |
| 24 | N | * | * | * | * | * | * | |
| 25 | O | 466 | 533 | 904 | 0.59 | 0.47 | FP + B | |
| 26 | P | 337 | 552 | 811 | 0.68 | 0.45 | FP | |
| 27 | Q | * | * | * | * | * | * | |
| 28 | R | * | * | * | * | * | * | |
| 29 | S | 487 | 563 | 1006 | 0.56 | 0.44 | FP | |
| 30 | T | 476 | 508 | 785 | 0.65 | 0.44 | FP | |
| 31 | U | 344 | 554 | 990 | 0.56 | 0.50 | FP + B | |
| 32 | V | * | * | * | * | * | * | |
| 33 | W | 240 | 563 | 894 | 0.63 | 0.48 | FP | |
| 34 | X | 224 | 552 | 874 | 0.63 | 0.47 | FP | |
| 35 | Y | 347 | 542 | 931 | 0.58 | 0.45 | FP | |
| 36 | Z | 393 | 514 | 921 | 0.56 | 0.43 | FP | |
| 37 | AA | 326 | 563 | 1031 | 0.55 | 0.48 | FP + B | |
| 38 | AB | 294 | 564 | 884 | 0.64 | 0.44 | FP | |

TABLE 5-continued

| Test No. | Steel No. | Rolled Steel Bar Total Decarburized Depth of Surface Layer μm | Forged Flat Sheet | | | | | Note |
|---|---|---|---|---|---|---|---|---|
| | | | 0.2% Proof Stress MPa | Tensile Strength MPa | Yield Ratio | Fatigue Limit Ratio | Micro-structure*2 | |
| 39 | AC | 316 | 557 | 998 | 0.56 | 0.47 | FP + B | |
| 40 | AD | 410 | 568 | 1059 | 0.54 | 0.45 | FP + B | |

*2FP: Ferrite and pearlite structures, B: bainite structure
*represents that the evaluation was not able to be performed.

Test Nos. 4 to 11 and 20 of Table 4 are Examples according to the present invention. All the total decarburized depth in surface layer of the rolled steel bars, which were scarfed all faces under conditions in which target scarfing amount is 3 mm, were 500 μm or less. In addition, in the forged article (forged flat sheets) obtained by forging the rolled steel bars, the tensile strengths were 948 MPa or higher, the 0.2% proof stresses were 597 MPa or higher, and the fatigue limit ratios (fatigue limit/tensile strength) obtained by the tension compression fatigue test were 0.47 or higher. In addition, from a comparison between Test Nos. 2 and 3 in table 4 in which the decarburized layer was removed by grinding after hot forging and Test Nos. 4 and 5, it can be seen that, in a case where the decarburized depth in the rolled steel bar is 500 μm or less, a decrease in the fatigue limit ratio is 0.02 or less.

Test Nos. 12 to 19 of Table 4 are Comparative Examples in which the decarburized depth of the rolled steel bar was more than 500 μm. These are rolled steel bar which are obtained by scarfing all faces at 1 mm and hot rolling. Each of these examples does not satisfy at least one of tensile strength: 900 MPa or higher, 0.2% proof stress: 570 MPa or higher, and fatigue limit ratio: 0.45 or more.

Test Nos. 21 to 39 of Table 5 are Comparative Examples produced using Steels Nos. K to AD in which the any of the steel component (chemical composition), Mn/S, K1, or K2, is out of the range of the present invention.

In Test Nos. 22, 23, 24, 27, 28, and 32 using Steel Nos. L, M, N, Q, R, and V in which M/S was lower than 8.0 or the K2 value was lower than 35%, cracks or large defects occur during steel bar forging, and thus the evaluation was not performed after hot forging. Therefore, the evaluation items of Table 5 are shown as "*".

In Test No. 33 (Steel No. W), the K1 value was low, and the tensile strength and the 0.2% proof stress did not reach 900 MPa and 570 MPa, which were desired values, respectively.

In Test No. 21 (Steel No. K), the C content, the Si content, and the K1 value were low, and the tensile strength and the 0.2% proof stress did not reach 900 MPa and 570 MPa, which were desired values, respectively.

In Test No. 34 (Steel No. X), the C content was low, and the tensile strength and the 0.2% proof stress did not reach 900 MPa and 570 MPa, which were desired values, respectively.

In Test No. 25 (Steel No. O), the Mn content was high, and not only ferrite and pearlite but also bainite were present together in the microstructure of the forged product. As the result, in Test No. 25, the 0.2% proof stress did not reach 570 MPa that was a desired value.

In Test No. 26 (Steel No. P) in which the K1 value was low, the 0.2% proof stress did not reach the desired value. In addition, in Test No. 26, the tensile strength also did not reach the desired value.

In Test No. 29 (Steel No. S), since the C content was high, the tensile strength was high, but the 0.2% proof stress and the fatigue limit ratio were low.

In Test No. 30 (Steel No. T), since the K1 value was low, the tensile strength and the 0.2% proof stress were low.

In Test No. 35 (Steel No. Y), and Test No. 36 (Steel No. Z), K1 value was satisfied and the tensile strength was good, but the 0.2% proof stress was low. In Test No. 36, the fatigue limit ratio was also low.

In Test No. 31 (Steel No. U), since the V content was high, the tensile strength and the fatigue limit ratio were good, but the 0.2% proof stress was low.

As shown in K2=139−28.6×Si+105×Mn−833×S—13420×N (Expression 2), Test No. 23 (Steel No. M) in table 5, Mn/S was low. Therefore, cracks during forging and defects occurred.

In Test No. 24 (Steel No. N), the Si content was high, and K2 was low. Therefore, cracks during forging and defects occurred.

In Test No. 28 (Steel No. R), Mn/S was low. Therefore, defects occurred.

In Test No. 32 (Steel No. V), the N content was high and K2 value was low. Therefore, cracks during forging and defects occurred.

In Test No. 38 (Steel No. AB), the K2 value was satisfied, but the N content was high. Therefore, the amount of V nitride increased, the contribution of V to precipitation strengthening was small, and the tensile strength, the 0.2% proof stress, and the fatigue limit ratio were low.

In Test No. 33 (Steel No. W) is a sample in which K1=0.93. In Test No. 33, since K1 was low, the tensile strength was less than 900 MPa.

In Test No. 25 (Steel No. 0), Test No. 37 (Steel No. AA), Test No. 39 (Steel No. AC), and Test No. 40 (Steel No. AD), the proof stress were low. It is considered that the proof stress were low because the Mn and/or Cr content was high or K1 values was high and thereby B (bainite) was present together with FP (ferrite pearlite).

INDUSTRIAL APPLICABILITY

In the surface of the rolled steel bar for machine structural use according to the above aspect of the present invention in which the Cr content and the Al content are limited and which includes a large amount of Si to reduce the costs, the formation of a deep decarburized layer can be prevented. A mechanical structural member which is produced by hot-forging the rolled steel bar has excellent fatigue resistance and thus remarkably contributes to the industry.

The invention claimed is:

1. A rolled steel bar for machine structural use having a chemical composition comprising, by mass %,
C: 0.45% to 0.65%,
Si: higher than 1.00% to 1.50%,
Mn: higher than 0.40% to 1.00%,
P: 0.005% to 0.050%,
S: 0.020% to 0.100%,
V: 0.08% to 0.20%,
Ti: 0% to 0.050%;
Ca: 0% to 0.0030%,
Zr: 0% to 0.0030%,
Te: 0% to 0.0030%, and
a remainder including Fe and impurities,
wherein the impurities include:
Cr: 0.10% or lower,
Al: lower than 0.01%, and
N: 0.0060% or lower,
K1 obtained from the following Expression 1 is 0.95 to 1.05,
K2 obtained from the following Expression 2 is more than 35,
a Mn content and a S content satisfy the following Expression 3,
a total decarburized depth of a surface layer is 500 µm or less, $$K1 = C + Si/7 + Mn/5 + 1.54 \times V \quad \text{(Expression 1)},$$

$$K2 = 139 - 28.6 \times Si + 105 \times Mn - 833 \times S - 13420 \times N \quad \text{(Expression 2)},$$

$$Mn/S \geq 8.0 \quad \text{(Expression 3), and}$$

C, Si, Mn, V, S, and N in the Expressions 1 to 3 represent the amounts of the respective elements in mass %.

2. The rolled steel bar for machine structural use according to claim 1, wherein the chemical composition further comprising, by mass %,
one or more selected from the group consisting of
Ti: 0.010% to 0.050%,
Ca: 0.0005% to 0.0030%,
Zr: 0.0005% to 0.0030%, and
Te: 0.0005% to 0.0030%.

3. A method of producing the rolled steel bar for machine structural use according to claim 2, the method comprising:
making molten steel having the chemical composition with said one or more of Ti, Ca, Zr and Te;
continuously casting the molten steel to obtain a cast piece;
blooming the cast piece to obtain a steel piece;
scarfing all faces of the steel piece after the blooming at 2 mm or more from a surface; and
performing a steel bar rolling after holding the steel piece after the scarfing at a heating temperature of 1000° C. to 1150° C. for 7000 seconds or shorter.

4. A method of producing the rolled steel bar for machine structural use according to claim 1, the method comprising:
making molten steel having the chemical composition;
continuously casting the molten steel to obtain a cast piece;
blooming the cast piece to obtain a steel piece;
scarfing all faces of the steel piece after the blooming at 2 mm or more from a surface; and
performing a steel bar rolling after holding the steel piece after the scarfing at a heating temperature of 1000° C. to 1150° C. for 7000 seconds or shorter.

* * * * *